United States Patent
Zeng et al.

(10) Patent No.: US 9,105,226 B2
(45) Date of Patent: Aug. 11, 2015

(54) SPATIO-TEMPORAL ERROR DIFFUSION FOR IMAGING DEVICES

(71) Applicant: QUALCOMM Incorporated, San Diego, CA (US)

(72) Inventors: Huanzhao Zeng, San Diego, CA (US); Jian J. Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/745,840

(22) Filed: Jan. 20, 2013

(65) Prior Publication Data

US 2014/0204114 A1 Jul. 24, 2014

(51) Int. Cl.
*G09G 3/20* (2006.01)
*G09G 3/34* (2006.01)
*H04N 1/405* (2006.01)
*H04N 19/86* (2014.01)

(52) U.S. Cl.
CPC ............ *G09G 3/2003* (2013.01); *G09G 3/2066* (2013.01); *G09G 3/3466* (2013.01); *H04N 1/4052* (2013.01); *H04N 19/86* (2014.11)

(58) Field of Classification Search
CPC ..... G09G 5/02; G09G 3/2051; G09G 3/2055; G09G 3/2022; G06T 15/503; G06T 2200/12
See application file for complete search history.

(56) References Cited

U.S. PATENT DOCUMENTS

| 7,352,373 | B2 | 4/2008 | Feng et al. |
| 7,420,570 | B2 | 9/2008 | Xu et al. |
| 7,450,181 | B2 | 11/2008 | Daly |
| 7,542,620 | B1 | 6/2009 | Bilbrey et al. |
| 8,243,093 | B2 | 8/2012 | Feng et al. |
| 2005/0157791 | A1 | 7/2005 | Sun |
| 2012/0106835 | A1 | 5/2012 | Bernal et al. |

FOREIGN PATENT DOCUMENTS

CN 1924970 A 3/2007

OTHER PUBLICATIONS

Hsu, et al., "Temporal Frequency of Flickering-Distortion Optimized Video Halftoning for Electronic Paper," IEEE Transactions on Image Processing, vol. 20, No. 9, Sep. 2011, pp. 2502-2514.
Hsu, et al., "Video Halftoning Preserving Temporal Consistency," IEEE International Conference on Multimedia, 2007, pp. 1938-1941.
Sun Z, "A Method to Generate Halftone Video," IEEE International Conference on Acoustics, Speech, and Signal Processing, 2005, vol. 2, pp. 565-568.
International Search Report and Written Opinion—PCT/US2014/011709—ISA/EPO—Apr. 3, 2014, 9 pp.
Response to Written Opinion from corresponding PCT Application Serial No. PCT/US2014/011709, filed on Nov. 20, 2014 (24 pages).
Second Written Opinion from corresponding PCT Application Serial No. PCT/US2014/011709, mailed on Mar. 17, 2015, 5 pp.
Response to Second Written Opinion dated Mar. 17, 2015, from corresponding PCT Application Serial No. PCT/US2014/011709 filed on Apr. 17, 2015, 20 pp.
International Preliminary Report on Patentability from corresponding PCT Application Serial No. PCT/US2014/011709 dated May 7, 2015 (18 pages).

*Primary Examiner* — Antonio A Caschera
(74) *Attorney, Agent, or Firm* — Shumaker & Sieffert, P.A.

(57) ABSTRACT

A method for reducing bit-depth of image data for an imaging device includes receiving an image frame for display to the imaging device. The method additionally includes applying temporal error diffusion for the image frame to produce a plurality of image subframes, wherein temporal errors generated in one subframe of the image frame are passed to a next subframe of the image frame for temporal error diffusion. The method also includes applying spatial error diffusion to remaining temporal errors from the temporal error diffusion of the image frame.

24 Claims, 4 Drawing Sheets

SPATIO-TEMPORAL ERROR DIFFUSION FOR IMAGING DEVICES

BACKGROUND

1. Field

Aspects of the present disclosure relate generally to reducing halftone artifacts, and more particularly, to a spatio-temporal error diffusion method that allows different temporal error propagation in different subframes to reduce halftone artifacts.

2. Background

Imaging devices have bit-depth limits for reproducing images. If the bit-depth of an imaging device (e.g., a display or a printer) is lower than that of the image data to be presented, the bit-depth of the source image data may be reduced to match the bit-depth of the device. Quantization is the simplest approach for bit-depth reduction. However, the image quality may be degraded. Halftoning (e.g., dithering or error diffusion) is a method to reduce bit-depth of the data but still preserve the macro-intensity levels. Spatial halftoning has been used in printing to convert 8-bit/channel data to 1-bit/channel binary data. If the resolution is sufficiently high and dot shape is well controlled, a binary printer can produce photo quality images. Since the resolution of a display is generally more limited, patterns from spatial halftoning may be visible.

To increase the image quality, temporal halftoning (or temporal modulation) may be incorporated to increase the bit-depth. In an analog interferometric modulator (AiMOD) display, each pixel can only be turned on or off, thus, no gray scale can be produced natively. This is very similar to printing, in which a dot is either placed or not placed onto a page. Although applying spatial dithering (e.g., error diffusion) can produce gray scale effects, halftone patterns may be visible due to the resolution limit. Temporal modulation is typically incorporated to increase the bit-depth and, therefore, reduce the halftone artifact. The visual noise between spatial halftoning and temporal halftoning are different. If the spatial resolution of a display is not high enough, halftone patterns will be visible and, thus, noisy. Temporal halftoning may produce no visual artifacts when implemented on a display in which the refreshing rate is higher than human eye can sense. However, if a display's refresh rate is not high enough to arrange subframes for temporal modulation, the flickering effect will be very noisy. In a reflective display, such as an AiMOD display, another side-effect of using temporal modulation is that it consumes more power.

Other attempts to solve the problem of reducing half-tone artifacts exist, but these solutions experience limitations or disadvantages. For example, one solution has been to only use spatial vector error diffusion, but this solution trades poor image quality for potentially no temporal flickering. Another solution has been to only use temporal modulation. However, while this solution may achieve increased bit-depths, it does not produce sufficient intensity levels for binary display devices. An additional solution has been to use spatial halftoning and temporal dithering, such as using spatial halftoning to more than two levels, and then applying a dithering mask to produce the gray levels. However, this solution is not an ideal choice for binary displays. A further solution is to maximize temporal error diffusion, and then allocate the residual error from the last subframe to spatial halftoning, but this solution also suffers from potential temporal flickering. Still another solution involves content-dependent halftoning, but such a process is both complicated and unreliable.

SUMMARY

Techniques for spatio-temporal error diffusion that allows different temporal error propagation in different subframes to reduce halftone artifacts are described herein.

In an aspect a method for reducing bit-depth of image data for an imaging device includes receiving an image frame for display to the imaging device. The method additionally includes applying temporal error diffusion for the image frame to produce a plurality of image subframes, wherein temporal errors generated in one subframe of the plurality of image subframes are passed to a next subframe of the plurality of image subframes for temporal error diffusion. The method also includes applying spatial error diffusion to remaining temporal errors from the temporal error diffusion of the image frame.

In another aspect, an apparatus for reducing bit-depth of image data for an imaging device includes means for receiving an image frame for display to the imaging device. The apparatus additionally includes means for applying temporal error diffusion to the image frame to produce a plurality of image subframes, wherein temporal errors generated in one subframe of the of the image frame are passed to a next subframe of the plurality of image subframes for temporal error diffusion. The apparatus further includes means for applying spatial error diffusion to remaining temporal errors from the temporal error diffusion of the image frame.

In an additional aspect, a computer program product includes a computer-readable medium. The computer-readable medium includes code for causing a computer to receive an image frame for display to the imaging device. The computer-readable medium additionally includes code for causing a computer to apply temporal error diffusion for the image frame to produce a plurality of image subframes, wherein temporal errors generated in one subframe of the plurality of image subframes are passed to a next subframe of the plurality of image subframes for temporal error diffusion. The computer-readable medium further includes code for causing a computer to apply spatial error diffusion to remaining temporal errors from the temporal error diffusion of the image frame.

In a further aspect, an image processing device to reducing bit-depth of image data for an imaging device includes at least one processor and a memory coupled to said at least one processor. The at least one processor is configured to receive an image frame for display to the imaging device. The at least one processor is additionally configured to apply temporal error diffusion for the image frame to produce a plurality of image subframes, wherein temporal errors generated in one subframe of the plurality of image subframes are passed to a next subframe of the plurality of image subframes for temporal error diffusion. The at least one processor is further configured apply spatial error diffusion to remaining temporal errors from the temporal error diffusion of the image frame.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The present disclosure provides a new method of temporal modulation and spatial halftoning by using 3-dimensional vector error diffusion for AiMOD displays. Temporal error diffusion (TED) is executed first for each subframe, while spatial error diffusion (SED) is executed last. This sequence prevents lightness errors from some or all subframe TED from being propagated to subsequent subframes, but to be cumulated for SED. This disclosed process effectively reduces temporal flickering from temporal modulation.

The propagation of the temporal dithering errors can be spread to both the temporal domain and the spatial domain. The spreading of errors from the temporal modulation can be adjusted to minimize visual artifacts or to save power consumption. The propagation of errors from the temporal modulation to the spatial domain can be adjusted differently for luminance and chrominance channels to further optimize the image quality.

Figure 1:
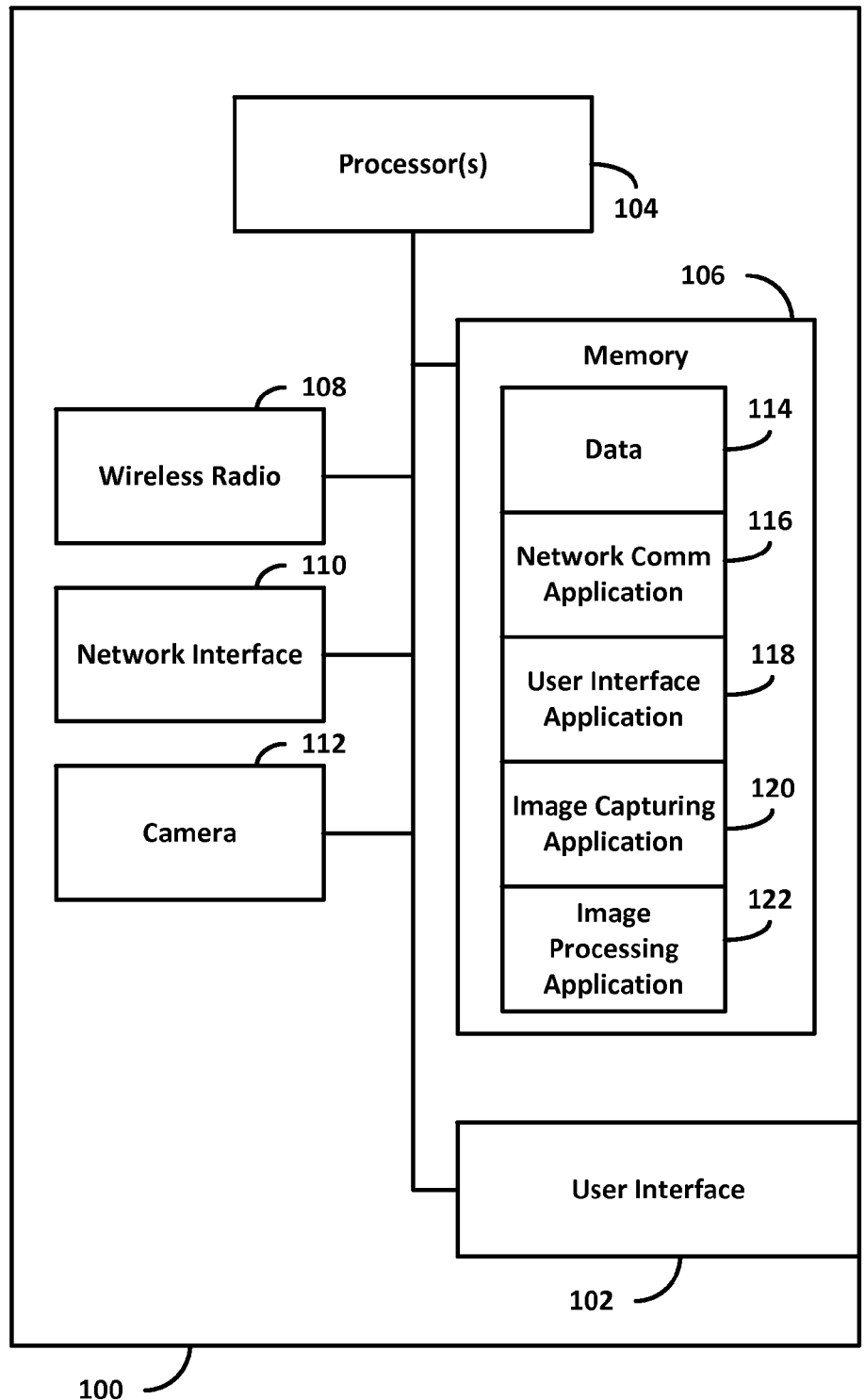
FIG. 1 is a block diagram conceptually illustrating an example of an imaging device implementing an image processing device in accordance with aspects of the present disclosure.

Turning to FIG. 1, it is envisioned that, in some aspects, the image processing apparatus disclosed herein may receive images remotely, and may display images to a remote display of a remote imaging device. However, in other aspects, the image processing apparatus disclosed herein may be integrated with an imaging device, such as imaging device 100. Such an imaging device 100 may be a smartphone, tablet, television, or any other device having a user interface 102 including a display. It is envisioned that the display may be of any type, but a binary display is of particular interest in discussing the advantages of the disclosed image processing apparatus. For example, the display may be an AiMOD display.

Unlike many other displays in which multi-intensities in each primary is produced for color reproduction, primary colors in AiMOD display can only be turned on or turned off. The intensity of each color has to be generated by temporal modulation and/or spatial dithering. Because of a limited refresh rate, temporal modulation cannot be infinitive. Based on the specification of the spatial resolution and refresh rate of the AiMOD display, good image quality is not available without applying both spatial dithering and temporal dithering. Accordingly, spatiotemporal error diffusion is applied for halftoning.

Spatiotemporal error diffusion may be implemented as TED followed by SED. Errors from TED in each subframe are spread to the next subframe, and eventually spread to the spatial domain for SED. A new spatiotemporal modulation method was developed to reduce temporal modulation in lightness, and thus to avoid temporal modulation flickering.

Additional features of the example imaging device 100 may include one or more processors 104 connected to memory 106 by any suitable data bus or other communication medium. Further hardware components connected to the data bus or other communication medium may include a wireless radio 108, network interface 110, and a camera 112. Data 114 and applications residing in memory 106 may configure the one or more processors 104 to operate the user interface 102, wireless radio 108, network interface 110, and camera 112 in a manner that will be readily apparent to one skilled in the art. For example, a network communications application 116 may operate the wireless radio 108 and network interface 110 to accomplish network communications according to any suitable protocols, such as a cellular protocol (e.g., LTE, CDMA, TDMA, CoMP, etc.) and an Internet Protocol (IP). Additionally, a user interface application 118 may operate input and output components 102 to receive data and commands, and to render images, video, and sound to output components of the user interface 102. Also, an image capturing application 120 may operate camera 112 to capture images and store the images in the data 114. Any of these components, in combination with processors 104, memory 106, data 116, and applications 114-120, may serve as a means for receiving an image frame for display to the imaging device 100.

Figure 2:
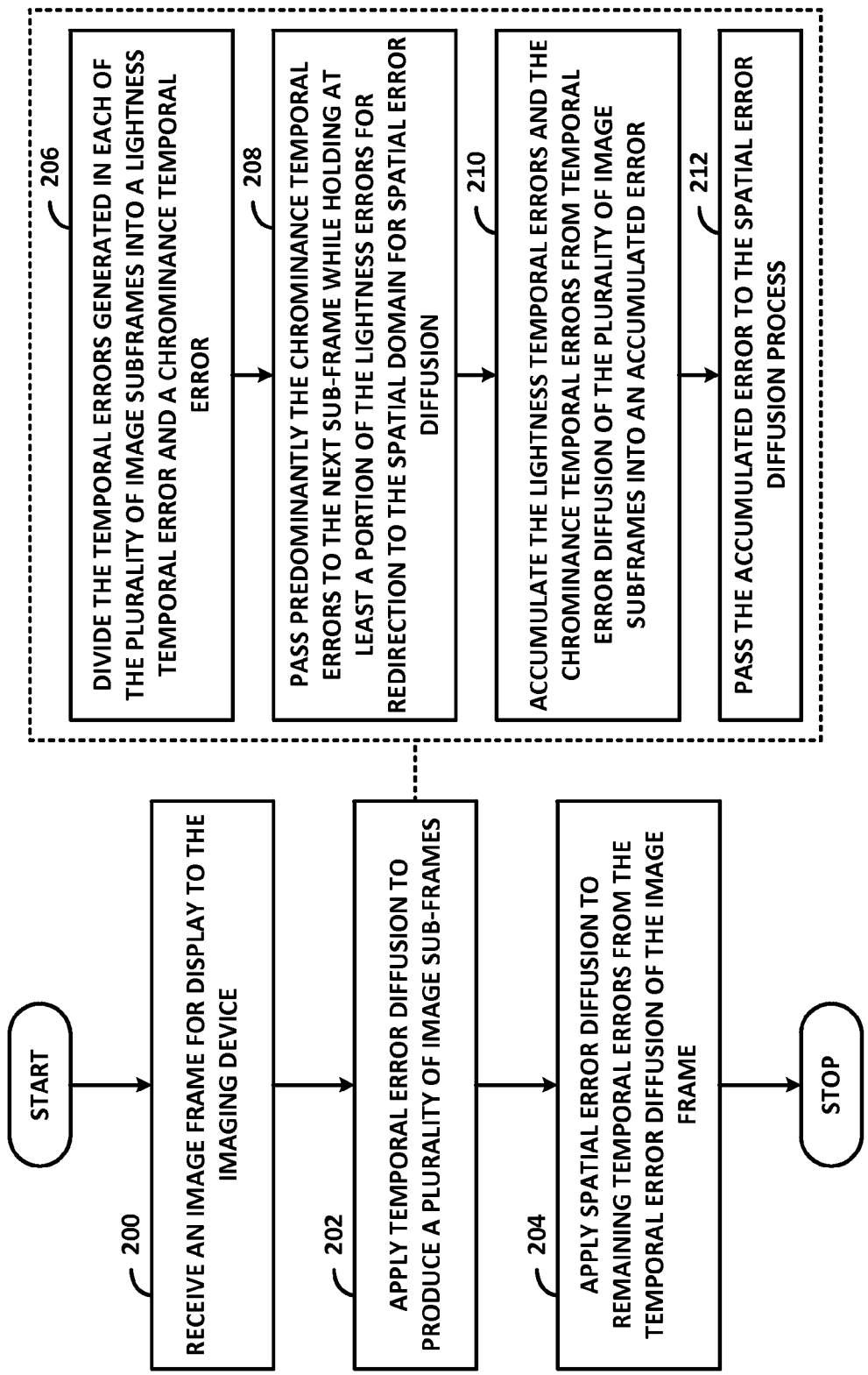
FIG. 2 illustrates example blocks of a process for reducing bit-depth of image data for an imaging device in accordance with the present disclosure.

Turning now to FIG. 2, and referring generally to FIG. 1 and FIG. 2, an image processing application 122 residing in memory 106 may configure the one or more processors 104 to process images according to temporal modulation and spatial halftoning process illustrated in FIG. 2. For example, image processing application 122 may configure the one or more processors 104 to access data 114 and retrieve an image frame from memory 106. Accordingly, the one or more processors 104, memory 106, data 114, and image processing application 122 may accomplish a means for receiving, at block 200, an image frame for display to the imaging device. Additionally, the process configured by image processing application 122 may include, at block 202, applying temporal error diffusion for the image frame. As further explained below, in block 202, temporal errors generated in one subframe of the image frames may be passed to a next subframe of the image frames for temporal error diffusion. Also, the processing configured by image processing application 122 may include, at block 204, applying spatial error diffusion to remaining temporal errors from the plurality of image subframes produced by temporal error diffusion.

Considering the process of block 202 in greater detail, the process may include several operational blocks. For example, at block 206, the temporal errors generated in each of the plurality of image subframes may be divided into a lightness temporal error and a chrominance temporal error. Additionally, at block 208, the chrominance temporal errors may be predominantly passed to the next subframe, while at least a portion of the lightness errors may be held for redirection to the spatial domain for spatial error diffusion. At block 208, it is contemplated that the temporal errors passed to the next subframe may include only the chrominance temporal errors. Alternatively, it is contemplated that, at block 208, the temporal errors passed to the next subframe may include a portion of the chrominance temporal errors and a smaller portion of the lightness temporal errors. Also, at block 210, the process may include accumulating the lightness temporal errors and the chrominance temporal errors from the plurality of subframes produced by temporal error diffusion into an accumulated error. Further, at block 212, the accumulated error may be passed to the spatial error diffusion process for use at block 204. Additional details of the procedures of FIG. 2 are discussed below with reference to FIG. 4. However, before turning to FIG. 4, a prior art spatiotemporal error diffusion process is described for purposes of comparison.

Figure 3:
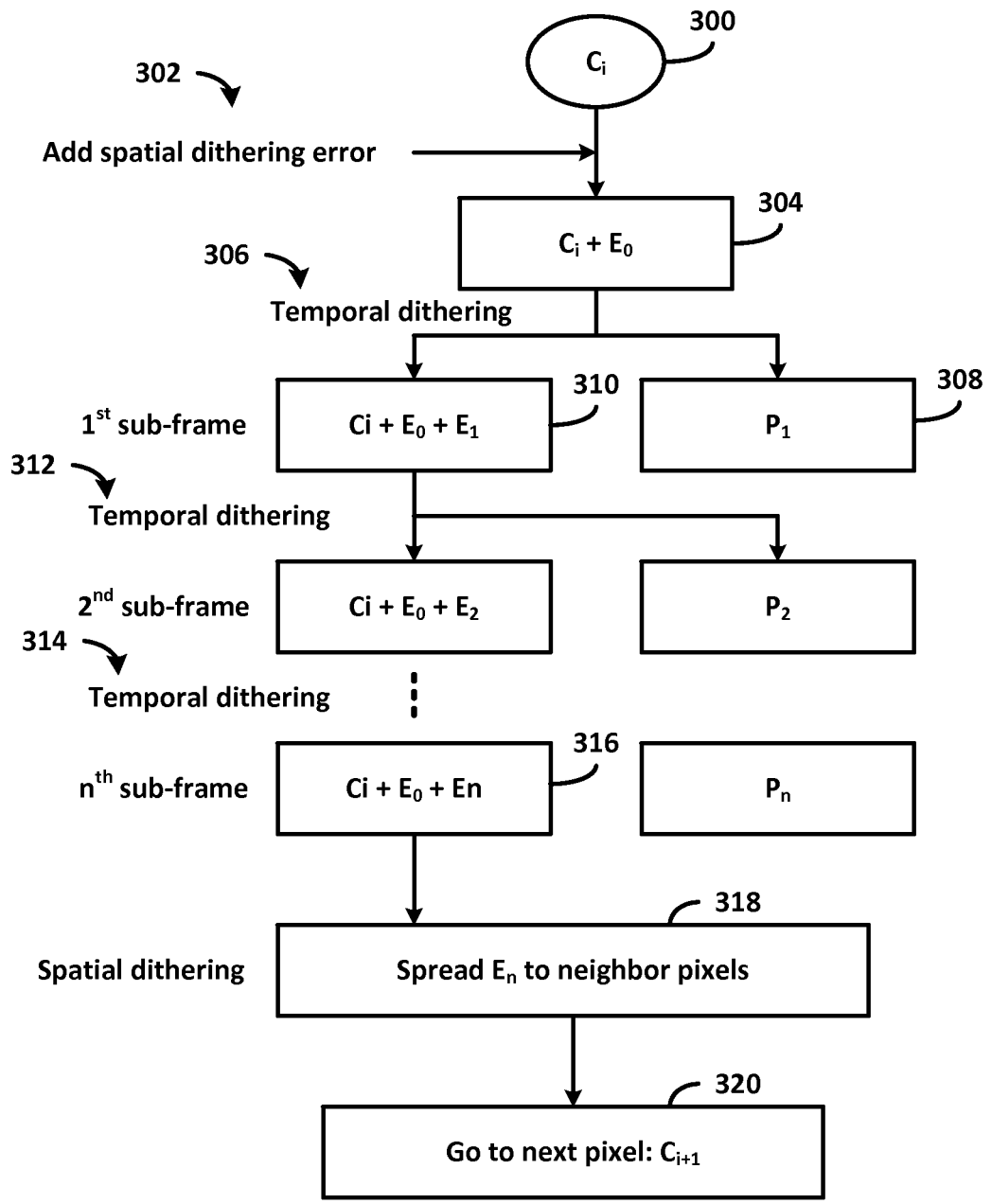
FIG. 3 illustrates example blocks of a conventional spatiotemporal vector error diffusion process in accordance with the prior art.

FIG. 3 illustrates the conventional spatiotemporal error diffusion process according to the prior art. In this process, the color of i-th pixel is noted $C_i$ at 300. At 302, adding errors dispersed from neighbor pixels causes the color to become $C_i+E_0$ at block 304. With temporal vector error diffusion, at 306, a closest primary, $P_1$, is found, at block 308, and the residue error, $E_1$, is carried over to the next subframe at block 310. The temporal error diffusion is continued, at 310, 312, and 314 until the limit of subframes is reached, resulting in a final residue error, $E_n$, at block 316. Finally, the final residue error, $E_n$, is spread to neighbor pixels by spatial error diffusion at block 318, and processing proceeds to the next pixel at block 320. One skilled in the art will readily appreciate that this method intrinsically carries over all temporal error diffusion error from one subframe to the next until the end of the last subframe. As such, it maximizes the error propagation within the temporal domain.

Figure 4:
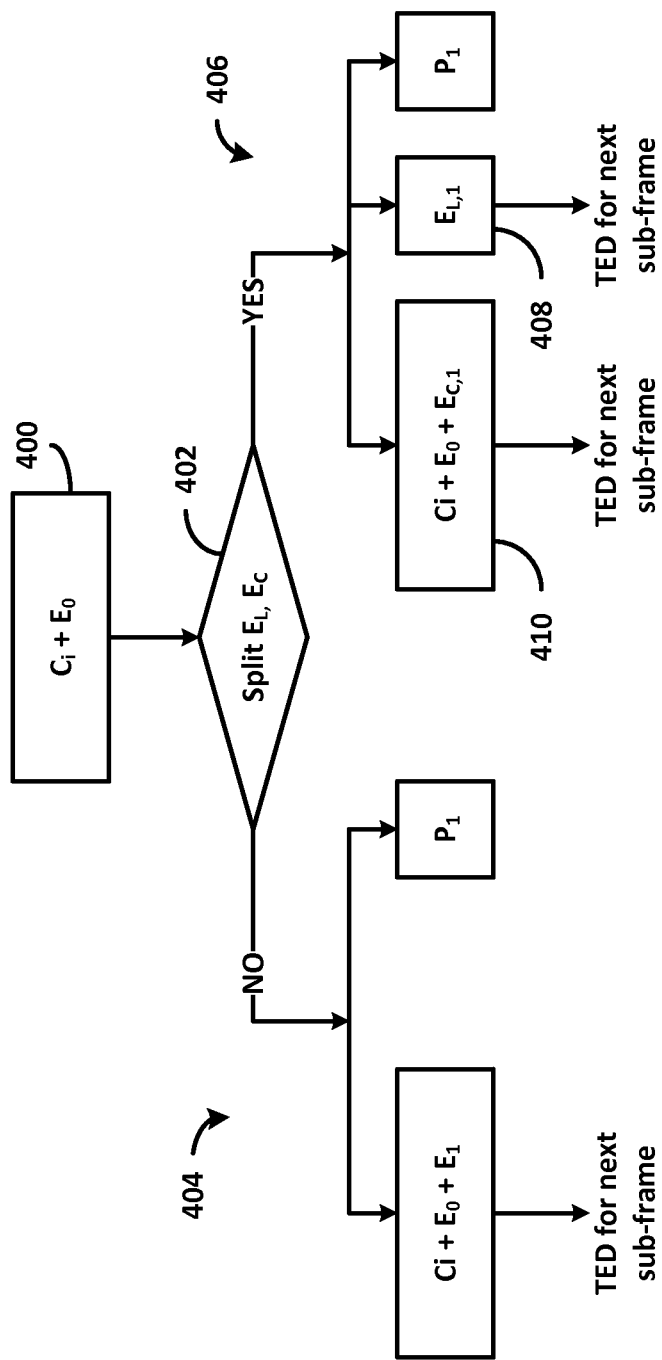
FIG. 4 illustrates example blocks of a spatiotemporal vector error diffusion process in which the lightness error from temporal error diffusion can be held and redirected to the spatial domain for spatial error diffusion.

Turning now to FIG. 4, TED is modified to adjust error propagation between the temporal halftone and the spatial halftone. Upon obtaining, at block 400, the color having added errors dispersed from the neighbor pixels, a determination may be made, at block 402, whether to divide the temporal errors generated in each of the plurality of image subframes into a lightness temporal error $E_L$ and a chrominance temporal error $E_C$. This determination at block 402 may also be a determination whether to allow at least a portion of the lightness temporal error $E_L$ to be held for redirection to the spatial domain for spatial error diffusion, rather than passed to the next subframe. If a determination is made, at block 402, not to divide the temporal errors generated in each of the plurality of image subframes into a lightness temporal error $E_L$ and a chrominance temporal error $E_C$, then image processing may be carried out at 404 in the manner described above with reference to FIG. 3. Such a determination may be made based on a type of display, a user setting, image content, video frame rate, or any other criterion or combination of criteria. However, if a determination is made, at block 402, to divide the temporal errors generated in each of the plurality of image subframes into a lightness temporal error $E_L$ and a chrominance temporal error $E_C$, then image processing may be carried out accordingly at 406. This processing is further described below.

In FIG. 4, $E_1=E_L+E_C$, where $E_L$ and $E_C$ are lightness error and chrominance error. Also, $E_C=E_a+E_b$, where $E_a$ and $E_b$ are the chrominance errors in two chrominance channels. Additionally, $C_i$ is the i-th pixel color, (L*, a*, b*) if in CIELAB color space, and $E_0$ is the SED error spread from neighbor pixels. Further, $E_1$ is the dither error passed to TED, including lightness error ($E_L$) and color error ($E_C$) which includes error from a* and b*. Still further, $P_1$ is the halftone color (a primary) from TED, and a color error is the combination of errors in all channels. If the halftoning is performed in CIEL*a*b* color space, the color errors are:

$$E_{L^*}=L^*_i-L^*_P$$

$$E_{a^*}=a^*_i-a^*_P$$

$$E_{b^*}=b^*_i-b^*_P$$

where $(L^*_i, a^*_i, b^*_i)$ is L*a*b* values of a continuous tone color, and $(L^*_P, a^*_P, b^*_P)$ is L*a*b* values of a primary color being chosen. Halftone errors, $E_{L^*}$, $E_{a^*}$, and $E_{b^*}$, of a pixel are carried over to a subsequent subframe for temporal modulation and/or to neighbor pixels for spatial halftoning.

As shown at 404, if the temporal error is not split, all errors are passed to the next subframe. This processing is the same as the conventional method. In contrast, at 406, because the human eye is more sensitive in brightness flickering than chrominance flickering, the lightness error ($E_L$) may be held, at block 408, and only the chrominance error ($E_C$) passed to the next subframe for TED, at block 410. At the end of TED for all subframes, the reduce error (both lightness and chrominance errors) from the last subframe and the held lightness errors ($E_L$) that are not passed for TED are added together and passed for SED. Depending on the need to reduce or avoid flickering, $E_L$ from some or all of subframes may be held and eventually passed to the spatial domain.

It is envisioned that, in some aspects, the decision to propagate lightness errors may be made for some, but not all, frames, or for a portion of frames. For example, if four frames are used for temporal modulation, and a decision to reduce lightness error propagation in TED has been made, two of the four frames may be allowed to propagate the entire error of each frame to its next frame, whereas the other 2 frames may pass lightness errors to the spatial domain. It is also envisioned that, in some aspects, chrominance error from TED may be held for some subframes and passed to the spatial domain to further temporal modulation.

In summary, a 3-D halftoning method is disclosed. The halftoning starts with temporal error diffusion. The temporal halftoning error is parameterized to allocate between the temporal domain and the spatial domain, and the parameters to split the error can be independently controlled between the luminance channel and the chrominance channels. After the temporal error diffusion is completed for all subframes, the sum of the remaining temporal halftone error and the halftone errors from each subframe set aside for spatial dithering is passed to the spatial domain for spatial error diffusion.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for reducing bit-depth of image data of an image frame, the method comprising:
    receiving the image frame for display to an imaging device;
    applying, by one or more processors, temporal error diffusion for the image frame to produce a plurality of image subframes, wherein applying temporal error diffusion further comprises:
        allocating, using a first allocation of error, lightness temporal error between a temporal domain and a spatial domain for each image subframe of the plurality of image subframes, wherein allocating the lightness temporal error comprises allocating error in the temporal domain to a first set of subframes of the plurality of subframes and allocating error in the spatial domain to a second set of subframes of the plurality of subframes;
        allocating, using a second allocation of error, chrominance temporal error between the temporal domain and the spatial domain for each image subframe of the plurality of subframes, wherein the second allocation of error is different than the first allocation of error;
        applying temporal error diffusion to the error allocated in the temporal domain; and
        applying spatial error diffusion to the error allocated to the spatial domain.

2. The method of claim 1, wherein allocating the chrominance temporal error comprises accumulating the chrominance temporal error for all subframes of the plurality of image subframes.

3. The method of claim 1, wherein applying temporal error diffusion and applying spatial error diffusion comprises applying temporal error diffusion prior to applying spatial error diffusion.

4. The method of claim 1, wherein allocating the chrominance temporal error comprises allocating error in the temporal domain to a first set of subframes of the plurality of subframes and allocating error in the spatial domain to a second set of subframes of the plurality of subframes.

5. The method of claim 1, wherein the first set of subframes alternate with the second set of subframes in the plurality of subframes, such that allocating the error in the temporal domain to the first set of subframes comprises propagating the error in the temporal domain to every other subframe of the plurality of image subframes.

6. The method of claim 1, wherein the plurality of image subframes comprises four image subframes, and wherein allocating the error in the spatial domain to the second set of subframes comprises passing the error in the spatial domain to two image subframes of the four image subframes.

7. An apparatus for reducing bit-depth of image data of an image frame for an imaging device, said apparatus comprising:
    means for receiving the image frame for display to the imaging device;
    means for applying temporal error diffusion to the image frame to produce a plurality of image subframes, wherein the means for applying temporal error diffusion further comprises:
        means for allocating, using a first allocation of error, lightness temporal error between a temporal domain and a spatial domain for each image subframe of the plurality of image subframes, wherein the means for allocating the lightness temporal error comprises means for allocating error in the temporal domain to a first set of subframes of the plurality of subframes and means for allocating error in the spatial domain to a second set of subframes of the plurality of subframes;

means for allocating, using a second allocation of error, chrominance temporal error between the temporal domain and the spatial domain for each image subframe of the plurality of subframes, wherein the second allocation of error is different than the first allocation of error;

means for applying temporal error diffusion to the error allocated in the temporal domain; and means for applying spatial error diffusion to the error allocated to the spatial domain.

8. The apparatus of claim 7, wherein the means for processing the chrominance temporal error comprises means for accumulating the chrominance temporal error for all subframes of the plurality of image subframes.

9. The apparatus of claim 7, wherein the means for applying temporal error diffusion and the means for applying spatial error diffusion comprises means for applying temporal error diffusion prior to applying spatial error diffusion.

10. The apparatus of claim 7, wherein the means for allocating the chrominance temporal error comprises means for allocating error in the temporal domain to a first set of subframes of the plurality of subframes and means for allocating error in the spatial domain to a second set of subframes of the plurality of subframes.

11. The apparatus of claim 7, wherein the first set of subframes alternate with the second set of subframes in the plurality of subframes, such that the means for allocating the error in the temporal domain to the first set of subframes comprises means for propagating the error in the temporal domain to every other subframe of the plurality of image subframes.

12. The apparatus of claim 7, wherein the plurality of image subframes comprises four image subframes, and wherein the means for allocating the error in the spatial domain to the second set of subframes comprises means for passing the error in the spatial domain to two image subframes of the four image subframes.

13. A non-transitory computer-readable medium having instructions stored thereon that, when executed, cause one or more processors to:

receive an image frame for display to an imaging device;

apply temporal error diffusion for the image frame to produce a plurality of image subframes, wherein to apply temporal error diffusion, the instructions further cause the one or more processors to:

allocate, using a first allocation of error, lightness temporal error between a temporal domain and a spatial domain for each image subframe of the plurality of image subframes, wherein to allocate the lightness temporal error, the instructions cause the one or more processors to allocate error in the temporal domain to a first set of subframes of the plurality of subframes and allocate error in the spatial domain to a second set of subframes of the plurality of subframes;

allocate, using a second allocation of error, chrominance temporal error between the temporal domain and the spatial domain for each image subframe of the plurality of subframes, wherein the second allocation of error is different than the first allocation of error;

apply temporal error diffusion to the error allocated in the temporal domain; and apply spatial error diffusion to the error allocated to the spatial domain.

14. The non-transitory computer-readable medium of claim 13, wherein to allocate the chrominance temporal error, the instructions cause the one or more processors to accumulate the chrominance temporal error for all subframes of the plurality of image subframes.

15. The non-transitory computer-readable medium of claim 13, wherein to apply temporal error diffusion and apply spatial error diffusion, the instructions cause the one or more processors to apply the temporal error diffusion prior to applying the spatial error diffusion.

16. The non-transitory computer-readable medium of claim 13, wherein to allocate the chrominance temporal error, the instructions cause the one or more processors to allocate error in the temporal domain to a first set of subframes of the plurality of subframes and allocate error in the spatial domain to a second set of subframes of the plurality of subframes.

17. The non-transitory computer-readable medium of claim 13, wherein the first set of subframes alternate with the second set of subframes in the plurality of subframes, such that to allocate the error in the temporal domain to the first set of subframes, the instructions cause the one or more processors to propagate the error in the temporal domain to every other subframe of the plurality of image subframes.

18. The non-transitory computer-readable medium of claim 13, wherein the plurality of image subframes comprises four image subframes, and wherein to allocate the error in the spatial domain to the second set of subframes, the instructions cause the one or more processors to pass the error in the spatial domain to two image subframes of the four image subframes.

19. An image processing device to reducing bit-depth of image data of an image frame for an imaging device, the image processing device comprising:

a memory configured to store the image frame for display to the imaging device; and one or more processors, the one or more processors configured to:

receive the image frame;

apply temporal error diffusion for the image frame to produce a plurality of image subframes, wherein to apply temporal error diffusion, the one or more processors are further configured to:

allocate, using a first allocation of error, lightness temporal error between a temporal domain and a spatial domain for each image subframe of the plurality of image subframes, wherein to allocate the lightness temporal error, the one or more processors are configured to allocate error in the temporal domain to a first set of subframes of the plurality of subframes and allocate error in the spatial domain to a second set of subframes of the plurality of subframes;

allocate, using a second allocation of error, chrominance temporal error between the temporal domain and the spatial domain for each image subframe of the plurality of subframes, wherein the second allocation of error is different than the first allocation of error;

apply temporal error diffusion to the error allocated in the temporal domain; and apply spatial error diffusion to the error allocated to the spatial domain.

20. The image processing device of claim 19, wherein to allocate the chrominance temporal error, the one or more processors are configured to accumulate the chrominance temporal error for all subframes of the plurality of image subframes.

21. The image processing device of claim 19, wherein to apply temporal error diffusion and spatial error diffusion, the one or more processors are configured to apply the temporal error diffusion prior to applying the spatial error diffusion.

22. The image processing device of claim 19, wherein to allocate the chrominance temporal error, the one or more processors are configured to allocate error in the temporal domain to a first set of subframes of the plurality of subframes and allocate error in the spatial domain to a second set of subframes of the plurality of subframes.

23. The image processing device of claim 19, wherein the first set of subframes alternate with the second set of subframes in the plurality of subframes, such that to allocate the error in the temporal domain to the first set of subframes, the one or more processors are configured to propagate the error in the temporal domain to every other subframe of the plurality of image subframes.

24. The image processing device of claim 19, wherein the plurality of image subframes comprises four image subframes, and wherein to allocate the error in the spatial domain to the second set of subframes, the one or more processors are configured to pass the error in the spatial domain to two image subframes of the four image subframes.

* * * * *